United States Patent
Beukema et al.

(10) Patent No.: US 7,362,705 B2
(45) Date of Patent: Apr. 22, 2008

(54) DYNAMIC LOAD-BASED CREDIT DISTRIBUTION

(75) Inventors: Bruce L. Beukema, Hayfield, MN (US); Jamie R. Kuesel, Rochester, MN (US); Robert A. Shearer, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 10/845,497

(22) Filed: May 13, 2004

(65) Prior Publication Data

US 2005/0254519 A1 Nov. 17, 2005

(51) Int. Cl.
*H04J 3/14* (2006.01)
*H04J 3/22* (2006.01)

(52) U.S. Cl. .......... 370/230; 370/235; 370/395.71; 370/468

(58) Field of Classification Search .......... None
See application file for complete search history.

(56) References Cited

U.S. PATENT DOCUMENTS

| | | | |
|---|---|---|---|
| 5,432,785 A * | 7/1995 | Ahmed et al. ............ 370/231 |
| 5,724,351 A * | 3/1998 | Chao et al. ............ 370/395.42 |
| 6,449,699 B2 | 9/2002 | Franke et al. |
| 6,820,143 B2 | 11/2004 | Day et al. |
| 6,820,174 B2 | 11/2004 | Vanderwiel |
| 7,149,184 B2 * | 12/2006 | Takada et al. ............ 370/230 |
| 2004/0042495 A1 * | 3/2004 | Sandstrom ............ 370/489 |
| 2004/0117592 A1 | 6/2004 | Day et al. |
| 2004/0162946 A1 | 8/2004 | Day et al. |
| 2004/0263519 A1 | 12/2004 | Andrews et al. |
| 2005/0071882 A1 * | 3/2005 | Rodriguez et al. ............ 725/95 |
| 2005/0198680 A1 * | 9/2005 | Baran et al. ............ 725/88 |
| 2005/0262537 A1 * | 11/2005 | Baran et al. ............ 725/88 |

* cited by examiner

*Primary Examiner*—Chi Pham
*Assistant Examiner*—Soon D. Hyun
(74) *Attorney, Agent, or Firm*—Patterson & Sheridan LLP

(57) ABSTRACT

Methods and systems for dynamically adjusting credits used to distribute available bus bandwidth among multiple virtual channels, based on the workload of each virtual channel, are provided. Accordingly, for some embodiments, virtual channels with higher workloads relative to other virtual channels may receive a higher allocation of bus bandwidth (more credits).

12 Claims, 4 Drawing Sheets

DYNAMIC LOAD-BASED CREDIT DISTRIBUTION

BACKGROUND OF THE INVENTION

1. Field of the Invention

The present invention generally relates to exchanging data on a bus between a shared buffer and one or more processors using a plurality of virtual channels and, more particularly to dynamic adjustment of credits used to allocate bandwidth of the bus to the virtual channels.

2. Description of the Related Art

A system on a chip (SOC) generally includes one or more integrated processor cores, some type of embedded memory, such as a cache shared between the processors cores, and peripheral interfaces, such as external bus interfaces, on a single chip to form a complete (or nearly complete) system. Often these systems include some type of buffer device used to store data passed between the SOC and an external device, such as an external memory controller. The buffer is typically shared between the processor cores of the SOC, which may pass data to and from the buffer pool over an internal bus as streams of data, commonly referred to as virtual channels.

Because the needs of each processor core may vary, many systems utilize a shared credit system to allocate bus bandwidth among the virtual channels. Typically, a pool of credits is allocated among the virtual channels, with each virtual channel allocated a certain number of credits, for example, based on an expected workload. In other words, each virtual channel's credit share determines its bus bandwidth relative to the other virtual channels. Typically, the credit allocation does not change (i.e., is static) over a given period, such as a power on cycle, or the running of a particular application. However, during this period changes in workload of the core processors may cause the current allocation to become non-optimal, for example, resulting in some of the virtual channels waiting a relatively long time to use the bus.

Accordingly, what is needed are methods and systems that dynamically re-allocate the credit shares among the virtual channels to allow the system to optimize itself to the current workload of the processor cores.

SUMMARY OF THE INVENTION

The present invention generally provides methods and systems that dynamically re-allocate credits used to allocate bus bandwidth among a plurality of virtual channels.

One embodiment provides a method of allocating bandwidth of a bus among a plurality of virtual channels, each virtual channel representing a stream of data exchanged on the bus. The method generally includes allocating, from a credit pool, a number of credits to each virtual channel, monitoring traffic on the bus to obtain one or more workload statistics indicative of bus traffic for each virtual channel, and dynamically adjusting the number of credits allocated to one or more of the virtual channels based on the one or more workload statistics.

Another embodiment provides a method of allocating bandwidth of a bus among a plurality of virtual channels, each virtual channel representing a stream of data exchanged on the bus. The method generally includes initializing a set of dynamic allocation parameters for each virtual channel, allocating, from a credit pool, a number of credits to each virtual channel, and monitoring traffic on the bus to obtain one or more workload statistics indicative of bus traffic for each virtual channel. The number of credits allocated to one or more of the virtual channels may be dynamically adjusted based on the one or more workload statistics and the set of dynamic allocation parameters.

Another embodiment provides a system generally including one or more processor cores, a shared buffer pool for holding data transferred from or to be transferred to the one or more processor cores, a bus coupling the shared cache and shared buffer pool, and a credit control component. The credit control component is generally configured to dynamically allocate, from a credit pool, credits among a plurality of virtual channels used to exchange data between the one or more processing cores and the shared buffer pool based on monitored traffic on the virtual channels.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention dynamically adjust credits used to distribute available bus bandwidth among multiple virtual channels, based on the workload of each virtual channel. As a result, virtual channels with higher workloads relative to other virtual channels may receive a higher allocation of bus bandwidth (more credits). Such dynamic allocation of bus bandwidth may lead to improved system performance, as an overall amount of time the virtual channels have to wait to use the bus may decrease.

As used herein, the term virtual channel generally refers to a stream of data from one component to another. Virtual channels are referred to as virtual because, as multiple virtual channels may utilize a common physical interface (e.g., a bus), they appear and act as separate channels. Virtual channels may be implemented using various logic components (e.g., switches, multiplexors, etc.) utilized to route data, received over the common bus, from different sources to different destinations, in effect, as if there were separate physical channels between each source and destination. An advantage to utilizing virtual channels is that various processes utilizing the data streamed by the virtual channels may operate in parallel which may improve system performance (e.g., while one process is receiving/sending data over the bus, another process may be manipulating data and not need the bus).

While embodiments will be described with reference to virtual channels, the aspects described herein may be generally applied to dynamically allocating bus bandwidth between multiple sources sharing a common bus. The allocation scheme described herein may have particular advantage when applied to bus connections between components on a common device (or chip), due to the extremely high speeds that may be achieved thereby. However, the embodiments may also be used to advantage to dynamically allocate bandwidth of buses connecting separate devices to virtual channels.

An Exemplary System

Figure 1:
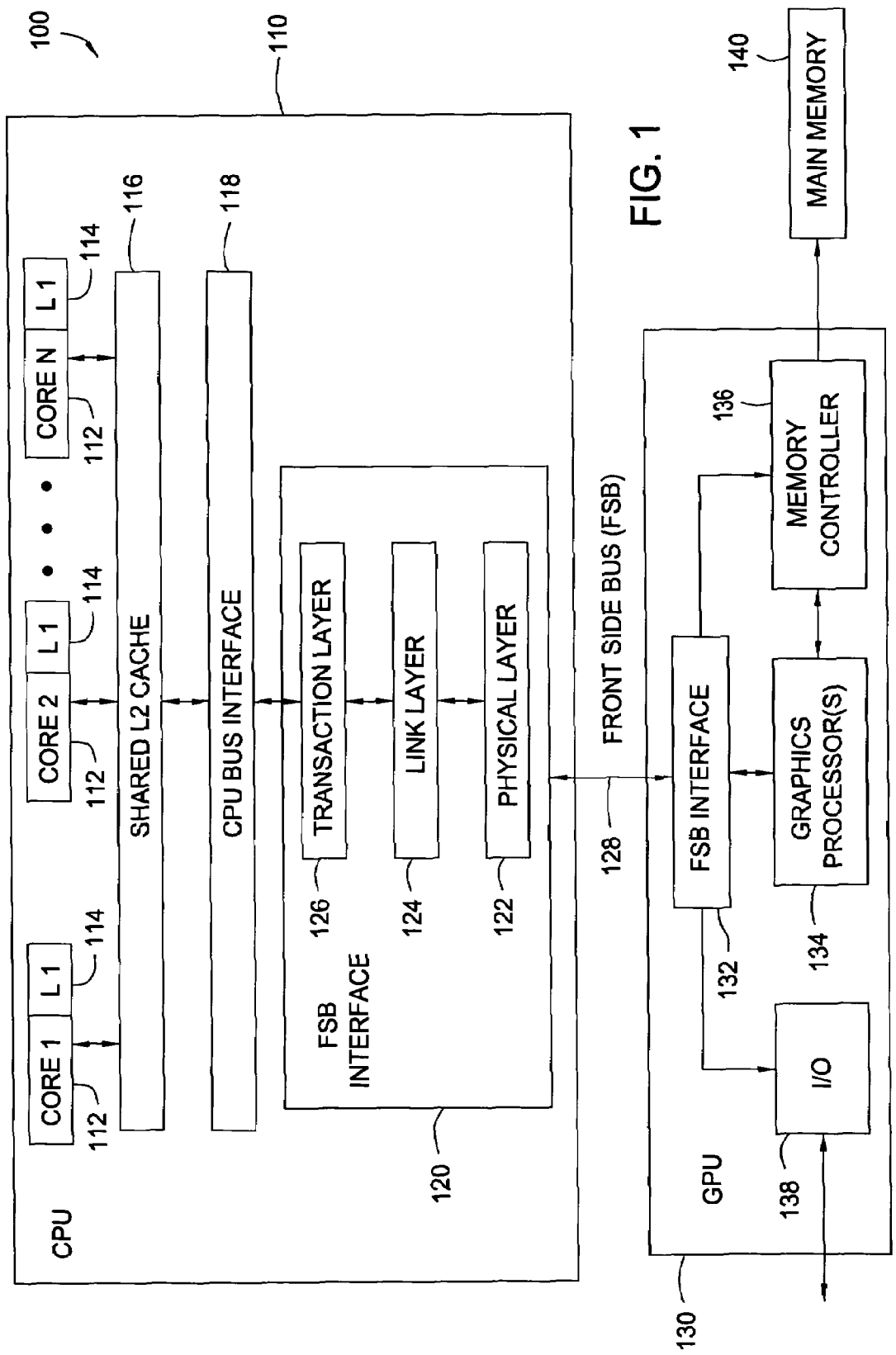
FIG. 1 illustrates an exemplary system including a central processing unit (CPU), in which embodiments of the present invention may be utilized.

FIG. 1 illustrates an exemplary computer system 100 including a central processing unit (CPU) 110, in which embodiments of the present invention may be utilized. As illustrated, the CPU 110 may include one or more processor cores 112, which may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from IBM.

As illustrated, each processor core 112 may have access to its own primary (L1) cache 114, as well as a larger shared secondary (L2) cache 116. In general, copies of data utilized by the processor cores 112 may be stored locally in the L2 cache 116, preventing or reducing the number of relatively slower accesses to external main memory 140. Similarly, data utilized often by a processor core may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB) 128. The CPU 110 may include an FSB interface 120 to pass data between the external devices and the processing cores 112 (through the L2 cache) via the FSB 128. An FSB interface 132 on the GPU 130 may have similar components as the FSB interface 120, configured to exchange data with one or more graphics processors 134, input output (I/O) unit 138, and the memory controller 136 (illustratively shown as integrated with the GPU 130).

Figure 2:
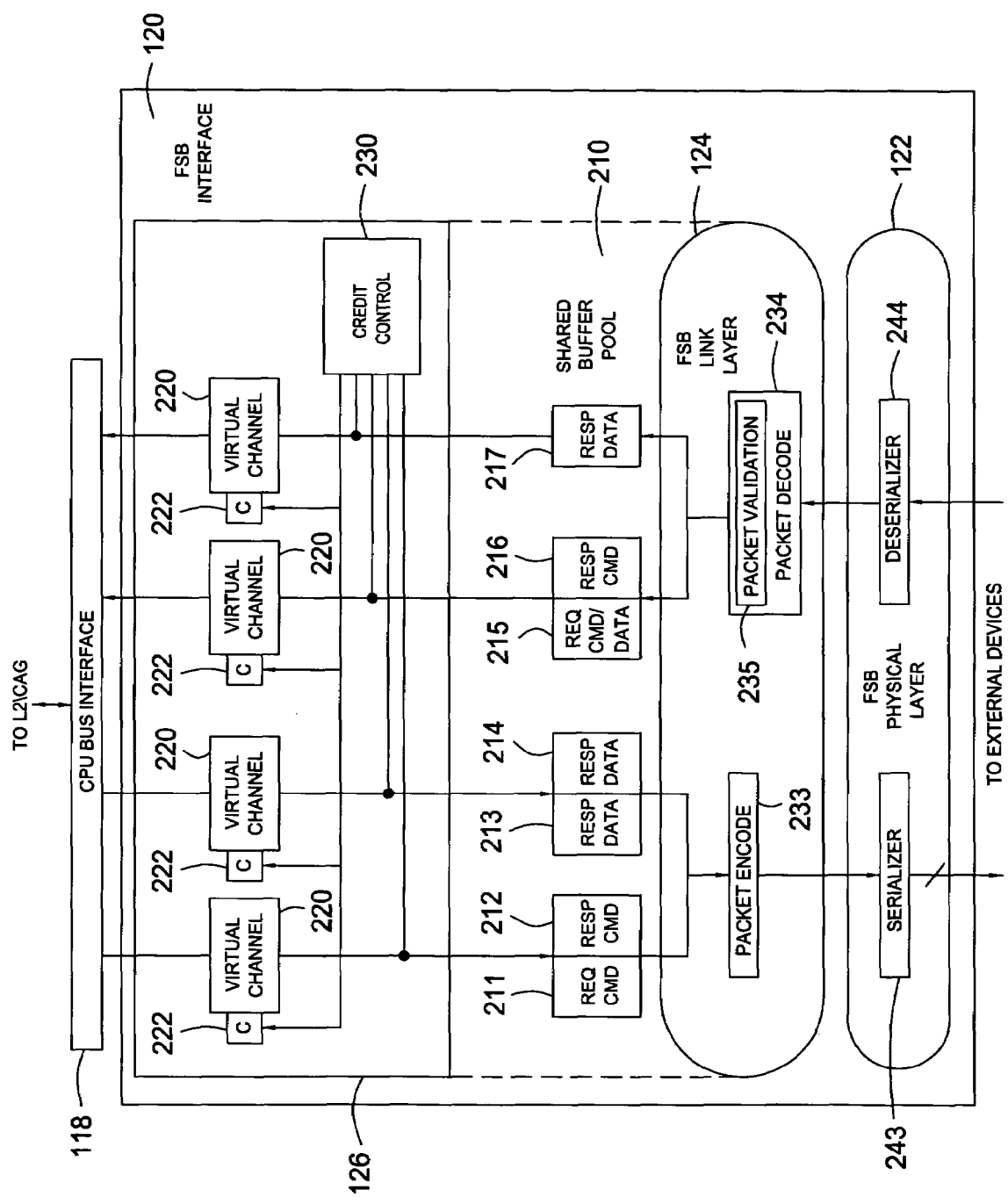
FIG. 2 is a block diagram of components of the CPU, according to one embodiment of the present invention.

As illustrated in FIG. 2, the FSB interface 120 may include a physical layer 122, link layer 124, and transaction layer 126. The physical layer 122 may include hardware components for implementing the hardware protocol necessary for receiving and sending data over the FSB 128. The physical layer 122 may exchange data with the link layer 124 which may format data received from or to be sent to the transaction layer 126. As illustrated, the transaction layer 126 may exchange data with the processor cores 112 via a core bus interface (CBI) 118. For some embodiments, data may be sent over the FSB as packets. Therefore, the link layer 124 may contain circuitry configured to encode into packets or "packetize" data received from the transaction layer 126 and to decode packets of data received from the physical layer 122, which may include a serializer 243 and a de-serializer 244 for generating and receiving such packets, respectively.

Dynamic Load-Based Credit Distribution

As shown in FIG. 2, a set of virtual channels 220 may be established to exchange data between the processor cores 112 and external devices. The virtual channels 220 may improve overall system performance, for example, allowing one processing core to transfer data while another processes data (and is not transferring data). However, as previously described, the load (e.g., volume of data transferred) by each virtual channel 220 may vary, for example, depending on a particular application for which it is being utilized. Therefore, dynamically adjusting the amount of total bus bandwidth allocated to each virtual channel 220 may further improve system performance, allowing those virtual channels 220 with increased load relative to others to have a greater allocated share of bus bandwidth, which may result in less idle (unproductive) waiting time.

For some embodiments, the amount of bus bandwidth allocated to each channel 220 may be set by assigning a number of credits Ci 222 (out of a total number of credits $C_{TOTAL}$ available in a shared credit pool) to each virtual channel. In other words, if all of the credits were assigned, the sum of the credits allocated to each virtual channel would equal the total:

$$\sum_{i=1}^{N} C_i = C_{TOTAL}$$

In effect, the total bus bandwidth allocated to each virtual channel may determine how much of a shared buffer pool 210 (used to hold data transferred to and/from the FSB) is available to each virtual channel 220. The greater the amount of bus bandwidth allocated a virtual channel 220, the faster that virtual channel 220 can fill up or unload data from the shared buffer pool 210. Therefore, the portion (P) of the buffer pool 210 allocated to any virtual channel 220 is proportional to that virtual channel's number of credits:

$P_i \propto C_i$

For example, as the volume of data transferred may generally exceed the volume of commands, buffers 213, 214, and 217 used to hold request and response data transferred by a virtual channel may be much greater than buffers 211, 212, and 216 used to hold request and response commands (while buffer 215 may hold both request commands and data).

For some embodiments, a credit control component 230 may be configured to control the number of credits 222 allocated to each virtual channel 220. The credit control component 230 may be configured to monitor the workload of each virtual channel and update the number of credits allocated to each accordingly. For some embodiments, the credit control component 230 may monitor the workload for each virtual channel by examining traffic transmitted over the CBI 118 and noting the destination and volume of data. For other embodiments, the credit control component 230 may be configured to monitor the average number of bus cycles each virtual channel must wait ($W_{AVG}$) to use the bus over a given period of time. In any case, such workload statistics may thus be kept for each virtual channel during some sample period, at the end of which credits may be adjusted accordingly.

Figure 3:
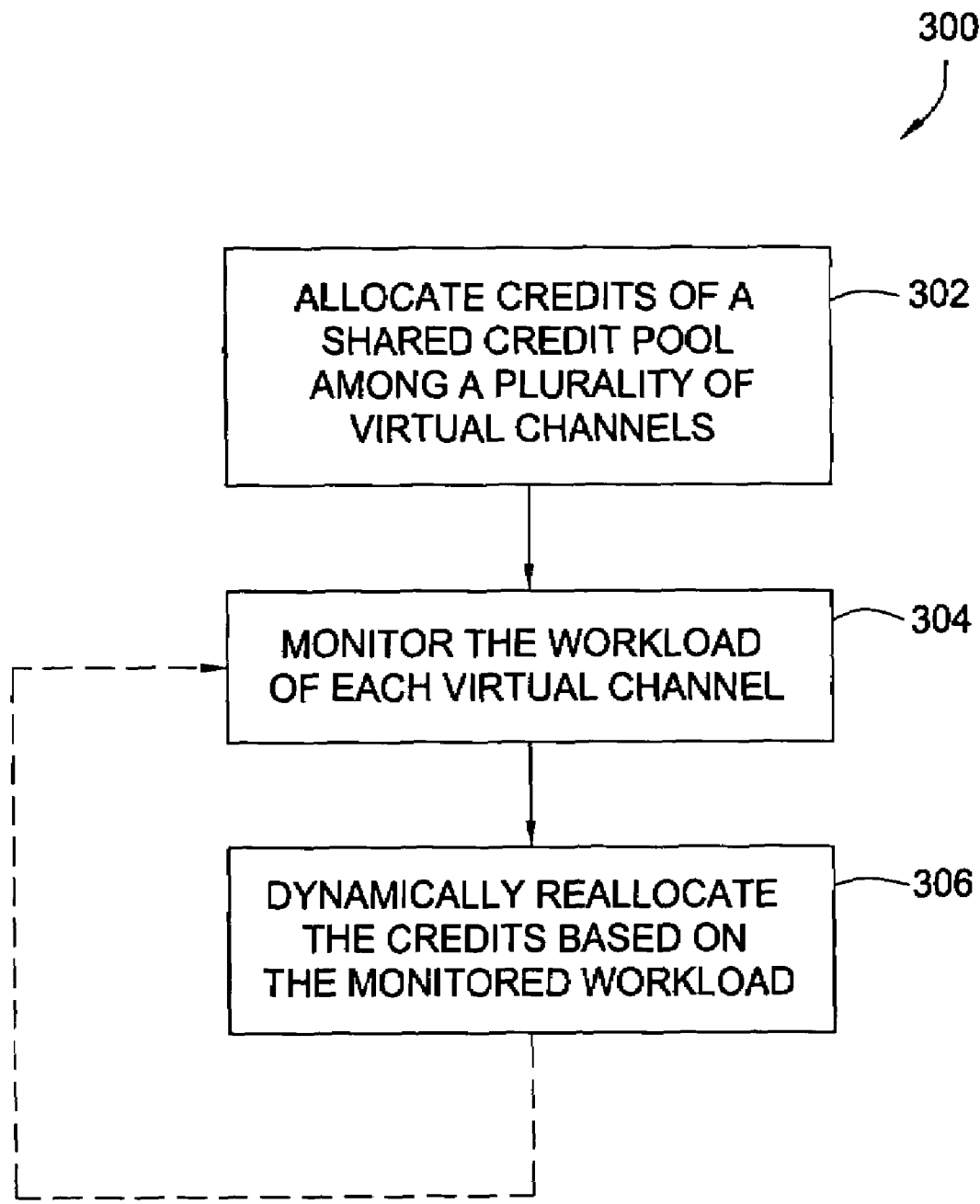
FIG. 3 is a general flow diagram of exemplary operations according to one embodiment of the present invention.

FIG. 3 illustrates exemplary operations 300 that may be performed, for example, by the credit control component to dynamically adjust the credits allocated to each virtual channel. The operations begin, at step 302, by allocating credits of a shared credit pool among a plurality of virtual channels, for example, according to some expected workload for each virtual channel. At step 304, the workload of each virtual channel is monitored. At step 306, the credits are re-allocated among the virtual channels based upon the monitored workload. For some embodiments, rather than re-allocate credits purely based on workload, there may be some type of adjustments or "weighting" to establish some type of priority, for example, to ensure virtual channels handling data for critical processes maintain some minimum bandwidth.

Dynamic Credit Allocation Parameters

For some embodiments, the distribution of credits may be automatically adjusted, based on a set of dynamic allocation parameters, for example, that define minimum and maximum credits for each virtual channel and/or minimum and maximum number of bus cycle each virtual channel is allowed to wait. For such embodiments, workload statistics may be kept for each virtual channel, such as the running average number of cycles a virtual channel has had to wait for the bus ($W_{AVG}$). For example, this running average may be compared against minimum and maximum average number of wait cycles ($W_{MIN}$ and $W_{MAX}$) specified for the virtual channel, and the number of credits allocated to that virtual channel may be adjusted accordingly. In some cases, a minimum and maximum number of credits to be allocate for each virtual channel ($C_{MIN}$ and $C_{MAX}$) may be specified. Of course, other parameters may also be specified, such as a maximum amount of change, maximum allowable variance in credits among the channels, and the sample period.

Figure 4:
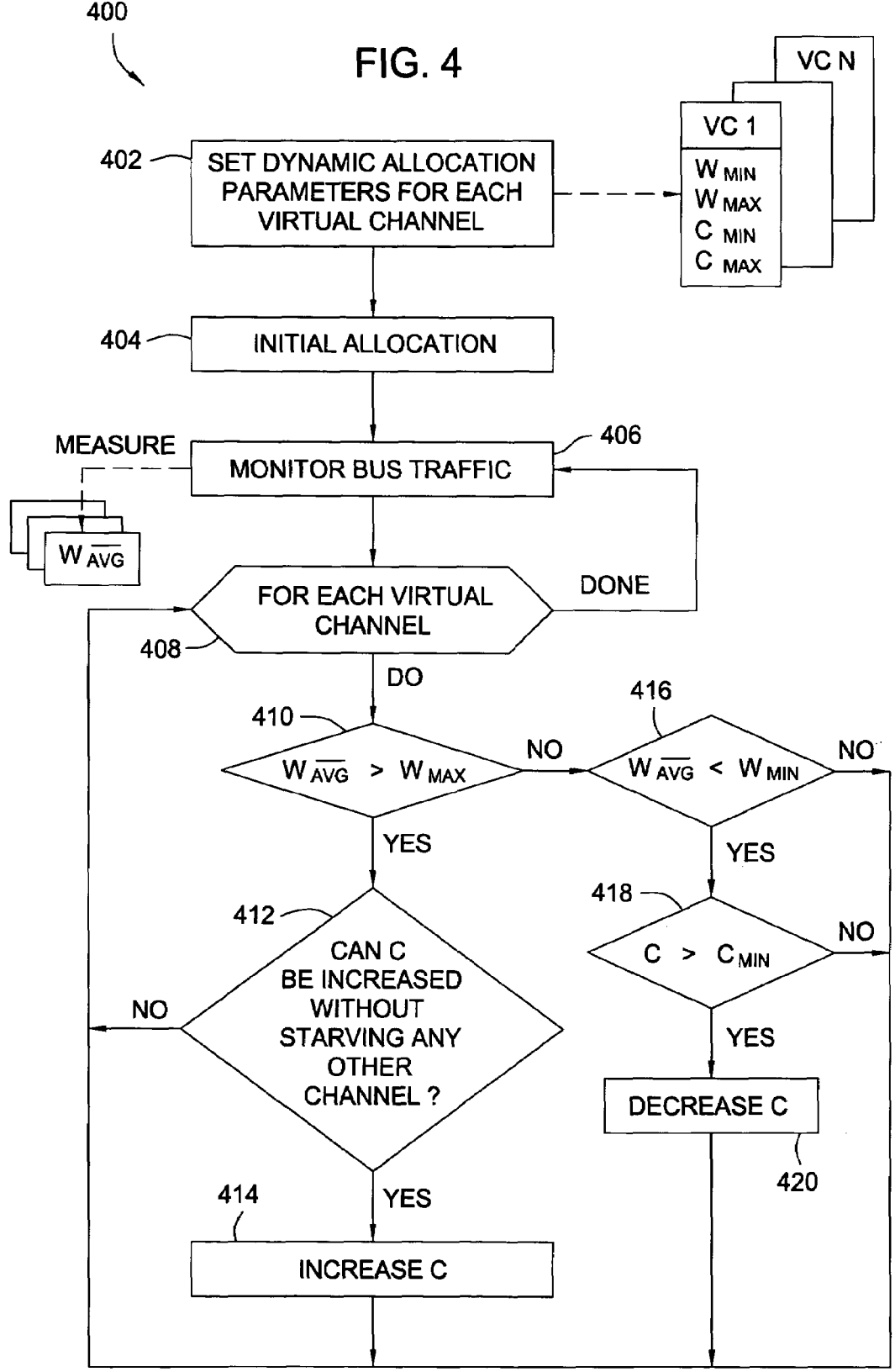
FIG. 4 is a more detailed flow diagram of exemplary operations according to one embodiment of the present invention.

In any case, an advantage to using such thresholds is that the credits may be allocated automatically (e.g., by the credit control component 230), for example, according to the exemplary operations 400 of FIG. 4. The operations 400 begin, at step 402, by setting dynamic allocation parameters for each virtual channel. The dynamic allocation parameters for each virtual channel may be different, for example, to accommodate applications with greater bus bandwidth requirements.

At step 404, an initial allocation of credits is performed. As previously described, this initial allocation of credits may be simply distribute the credits evenly, for example, by dividing the number of total credits by the number of virtual channels. Alternatively, the number of credits for each virtual channel may be varied, for example, by varying, for different virtual channels, the minimum and maximum number of credits specified in dynamic allocation parameters.

At step 406, bus traffic is monitored, for example, to calculate an average number of cycles each virtual channel must wait for the bus ($W_{AVG}$). For example, the credit control component 230 may include some type of logic to measure $W_{AVG}$. For some embodiments, in addition to (or instead of), the credit control component 230 may monitor workload for each virtual channel, for example, by measuring a total number of bytes exchanged over some predetermined time period.

At step 408, a loop of operations (410-420) is entered, to adjust the number of credits allocated to each virtual channel based on the monitored workloads and the dynamic allocation parameters. At step 410, the average workload (illustratively the average number of wait cycles $W_{AVG}$) of a selected virtual channel is compared against its specified maximum workload (illustratively, the maximum allowable number of wait cycles, $W_{MAX}$).

If the average workload exceeds the specified maximum, the current credit allocation of other virtual channels are examined, at step 412, to determine if the credit allocation of the selected virtual channel can be increased without starving other virtual channels. In other words, the credit control component 230 may determine if any of the other virtual channels have credits that they can give up (e.g., by comparing the credits allocated to other virtual channels against their specified minimum value, $C_{MIN}$). If so, the credit allocation for the selected virtual channel is increased, at step 414 (e.g., by decreasing a credit allocation of another virtual channel).

If the average workload does not exceed the specified maximum, the average workload is compared against its specified minimum workload (illustratively, $W_{MIN}$), at step 416. If the average workload is below the specified minimum, the current credit allocation of the selected virtual channel is compared against its specified minimum value ($C_{MIN}$), at step 418, to determine if the credit allocation of the selected virtual channel can be decreased. If the current credit allocation of the selected virtual channel is greater than its specified minimum value, the credit allocation for the selected virtual channel is decreased, at step 420. For some embodiments, to maintain the total number of credits allocated, the credit taken from the selected virtual channel may be allocated to another virtual channel (e.g., by incrementing the number of credits allocated to that virtual channel).

While the operations 410-420 are illustratively shown as being performed in series for each virtual channel, it should be understood that for some embodiments, some of the operations may be performed in parallel for multiple virtual channels. For example, for some embodiments, the average number of wait cycles measured for each virtual channel may be compared against its minimum and maximum specified values. Based on these comparisons, one or more data structures may then be generated indicating (e.g., with bits/flags) for which virtual channels the average number wait cycles ($W_{AVG}$) exceeded the maximum specified value ($W_{MAX}$) or fell below the minimum specified value ($W_{MIN}$). A routine may then be called that increases/decreases the number of credits for each virtual channel accordingly, based on these data structures.

Further, in some cases, the dynamic allocation parameters (e.g., $W_{MAX}$, $W_{MIN}$, $C_{MAX}$, and $C_{MIN}$) for at least one of the virtual channels may be updated periodically, for example, in an effort to optimize credit allocation of each virtual channel for a particular application. In other words, the minimum and maximum allowable wait cycles for a virtual channel, as well as the minimum and maximum number of credits, may vary for different applications. For example, some applications may handle more data and/or may be deemed critical and should, therefore, always be allocated at least a minimum portion of total bus bandwidth.

CONCLUSION

By dynamically adjusting the number of credits used to distribute available bus bandwidth among multiple virtual channels based on the workload of each virtual channel, system performance may be increased by reducing the total number of cycles any of the virtual channels have to wait. In some cases, a set of dynamic allocation parameters may be specified that dictates when and how the credit allocation for each virtual channel should be adjusted. Further, by changing these dynamic allocation parameters periodically, the performance of virtual channels may be tailored to accommodate various applications with different resource needs.

While the foregoing is directed to embodiments of the present invention, other and further embodiments of the invention may be devised without departing from the basic scope thereof, and the scope thereof is determined by the claims that follow.

What is claimed is:

1. A method of allocating bandwidth of a bus among a plurality of virtual channels, each virtual channel representing a stream of data exchanged on the bus, comprising:
   allocating, from a credit pool, a number of credits to each virtual channel;
   monitoring traffic on the bus to obtain one or more workload statistics indicative of bus traffic for each virtual channel; and
   dynamically adjusting the number of credits allocated to one or more of the virtual channels based on the one or more workload statistics, wherein the one or more workload statistics comprises an average number of bus cycles each virtual channel has to wait for the bus.

2. The method of claim 1, wherein dynamically adjusting the number of credits allocated to one or more of the virtual channels based on the one or more workload statistics comprises incrementing a number of credits allocated to a first virtual channel in response to determining the average number of bus cycles the first virtual channel has to wait exceeds a specified maximum value.

3. The method of claim 2, further comprising decrementing a number of credits allocated to a second virtual channel to maintain the total number of credits allocated from the credit pool.

4. A method of allocating bandwidth of a bus among a plurality of virtual channels, each virtual channel representing a stream of data exchanged on the bus, comprising:
   initializing a set of dynamic allocation parameters for each virtual channel;
   allocating, from a credit pool, a number of credits to each virtual channel;
   monitoring traffic on the bus to obtain one or more workload statistics indicative of bus traffic for each virtual channel; and
   dynamically adjusting the number of credits allocated to one or more of the virtual channels based on the one or more workload statistics and the set of dynamic allocation parameters, wherein the dynamic allocation parameters comprise a maximum number of bus cycles each virtual channel is allowed to wait for the bus.

5. The method of claim 4, wherein:
   the one or more workload statistics comprise a number of cycles each virtual channel must wait for the bus; and
   dynamically adjusting the number of credits allocated to one or more of the virtual channels comprises incrementing a number of credits allocated to a first virtual channel if the number of cycles the first virtual channel must wait exceeds the maximum number of bus cycles the first virtual channel is allowed to wait for the bus.

6. A method of allocating bandwidth of a bus among a plurality of virtual channels, each virtual channel representing a stream of data exchanged on the bus, comprising:
   initializing a set of dynamic allocation parameters for each virtual channel;
   allocating, from a credit pool, a number of credits to each virtual channel;
   monitoring traffic on the bus to obtain one or more workload statistics indicative of bus traffic for each virtual channel; and
   dynamically adjusting the number of credits allocated to one or more of the virtual channels based on the one or more workload statistics and the set of dynamic allocation parameters; wherein:
   the dynamic allocation parameters comprise a minimum number of bus cycles each virtual channel is allowed to wait for the bus;
   the one or more workload statistics comprise a number of cycles each virtual channel must wait for the bus; and
   dynamically adjusting the number of credits allocated to one or more of the virtual channels comprises decrementing a number of credits allocated to a first virtual channel if the number of cycles the first virtual channel must wait falls below the minimum number of bus cycles the first virtual channel is allowed to wait for the bus.

7. A method of allocating bandwidth of a bus among a plurality of virtual channels, each virtual channel representing a stream of data exchanged on the bus, comprising:
   initializing a set of dynamic allocation parameters for each virtual channel;
   allocating, from a credit pool, a number of credits to each virtual channel;
   monitoring traffic on the bus to obtain one or more workload statistics indicative of bus traffic for each virtual channel; and
   dynamically adjusting the number of credits allocated to one or more of the virtual channels based on the one or more workload statistics and the set of dynamic allocation parameters; wherein:
   the dynamic allocation parameters comprise a minimum allowable number of credits for each virtual channel; and
   dynamically adjusting the number of credits allocated to one or more of the virtual channels based on the one or more workload statistics and the set of dynamic allocation parameters comprises decrementing a current number of credits allocated to a first virtual channel only if the current number of credits allocated to the first virtual channel exceeds the minimum allowable number of credits for the first virtual channel.

8. A method of allocating bandwidth of a bus among a plurality of virtual channels, each virtual channel representing a stream of data exchanged on the bus, comprising:
   initializing a set of dynamic allocation parameters for each virtual channel;
   allocating, from a credit pool, a number of credits to each virtual channel;
   monitoring traffic on the bus to obtain one or more workload statistics indicative of bus traffic for each virtual channel; and
   dynamically adjusting the number of credits allocated to one or more of the virtual channels based on the one or more workload statistics and the set of dynamic allocation parameters; wherein:
   the dynamic allocation parameters comprise a minimum allowable number of credits for each virtual channel; and
   dynamically adjusting the number of credits allocated to one or more of the virtual channels based on the one or more workload statistics and the set of dynamic allocation parameters comprises incrementing a current number of credits allocated to a first virtual channel only if the current number of credits allocated to at least a second virtual channel exceeds the minimum allowable number of credits for the second virtual channel.

9. A system, comprising:
   one or more processor cores;

a shared buffer pool for holding data transferred from or to be transferred to the one or more processor cores;

a bus coupling the one or more processor cores and the shared buffer pool; and a credit control component configured to dynamically allocate, from a credit pool, credits among a plurality of virtual channels used to exchange data between the one or more processing cores and the shared buffer pool based on monitored traffic on the virtual channels; wherein the credit control component is configured to monitor a number of cycles each virtual channel must wait for the bus.

10. The system of claim 9, wherein the credit control component is configured to increment the number of credits allocated to a first virtual channel if the number of cycles the first virtual channel must wait for the bus exceeds a specified maximum number of cycles the first virtual channel is allowed to wait for the bus.

11. The system of claim 10, wherein the credit control component is configured to decrement the number of credits allocated to the first virtual channel if the number of cycles the first virtual channel must wait for the bus is below a specified minimum number of cycles the first virtual channel is allowed to wait for the bus.

12. The system of claim 10, wherein the credit control component is configured to increment the number of credits allocated to the first virtual channel only if the number of credits allocated to a second virtual channel may be decremented without causing the number of credits allocated to the second virtual channel to fall below a minimum allowable number of credits specified for the second virtual channel.

* * * * *